(12) United States Patent
Shi et al.

(10) Patent No.: US 12,327,545 B2
(45) Date of Patent: Jun. 10, 2025

(54) METHOD AND APPARATUS FOR TESTING FULL-DUPLEX SPEECH INTERACTION SYSTEM

(71) Applicant: AI SPEECH CO., LTD., Jiangsu (CN)

(72) Inventors: Weisi Shi, Suzhou (CN); Shuai Fan, Suzhou (CN); Hongbo Song, Suzhou (CN)

(73) Assignee: AI SPEECH CO., LTD., Jiangsu (CN)

( * ) Notice: Subject to any disclaimer, the term of this patent is extended or adjusted under 35 U.S.C. 154(b) by 273 days.

(21) Appl. No.: 17/990,149

(22) Filed: Nov. 18, 2022

(65) Prior Publication Data

US 2023/0077478 A1   Mar. 16, 2023

Related U.S. Application Data

(63) Continuation of application No. PCT/CN2020/129352, filed on Nov. 17, 2020.

(51) Int. Cl.
*G06F 17/00* (2019.01)
*G10L 15/01* (2013.01)
*H04L 5/14* (2006.01)

(52) U.S. Cl.
CPC ................ *G10L 15/01* (2013.01); *H04L 5/14* (2013.01)

(58) Field of Classification Search
CPC .................................. G10L 15/01; H04L 5/14
USPC ........................................................ 704/231
See application file for complete search history.

(56) References Cited

U.S. PATENT DOCUMENTS

| | | |
|---|---|---|
| 6,477,492 B1 | 11/2002 | Connor |
| 2005/0197836 A1 | 9/2005 | Cohen et al. |
| 2019/0371322 A1 | 12/2019 | Ma |

FOREIGN PATENT DOCUMENTS

| | | |
|---|---|---|
| CN | 106548772 A | 3/2017 |
| CN | 108228468 A | 6/2018 |
| CN | 108899012 A | 11/2018 |
| CN | 109032870 A | 12/2018 |
| CN | 109256115 A | 1/2019 |
| CN | 109360550 A | 2/2019 |
| CN | 110198256 A | 9/2019 |
| CN | 110379410 A | 10/2019 |
| CN | 110415681 A | 11/2019 |

(Continued)

OTHER PUBLICATIONS

International Search Report (English and Chinese) and Written Opinion of the International Searching Authority (Chinese) issued in PCT/CN2020/129352, mailed Feb. 25, 2021; ISA/CN.

(Continued)

*Primary Examiner* — Paul C McCord

(57) ABSTRACT

Disclosed are a method and apparatus for testing a full-duplex speech interaction system. The method includes: determining a scene mixed corpus set by mixing a valid corpus set related to a test scene with an invalid corpus set unrelated to the test scene; playing each corpus audio in the scene mixed corpus set to a speech interaction device under test equipped with the full-duplex speech interaction system; acquiring a work log of the speech interaction device under test, the work log including at least a first log and a second log; and obtaining number of false responses by counting number of log entries which have false response result in the second log, and determining a false response rate based on the number of false responses and a total number of corpus audios played. End-to-end testing of the full-duplex speech interaction system is realized.

10 Claims, 3 Drawing Sheets

(56) References Cited

FOREIGN PATENT DOCUMENTS

| | | | |
|---|---|---|---|
| CN | 111179907 | A | 5/2020 |
| JP | 2002328696 | A | 11/2002 |
| JP | 2004029215 | A | 1/2004 |
| JP | 2011154099 | A | 8/2011 |
| JP | 2014077969 | A | 5/2014 |
| JP | 2015045689 | A | 3/2015 |
| JP | 2017097233 | A | 6/2017 |
| WO | 2019098038 | A1 | 5/2019 |

OTHER PUBLICATIONS

Extended European Search Report Corresponding to European Application No. 209369255, dated Sep. 15, 2023.
A Practice Guide for Practical Application of AI, pp. 142 to 143.
Notice of Reasons for Refusal Corresponding to Japanese Patent Application No. 2022-569085, dated Jan. 5, 2025.

METHOD AND APPARATUS FOR TESTING FULL-DUPLEX SPEECH INTERACTION SYSTEM

CROSS-REFERENCE TO RELATED APPLICATIONS

This application is a Continuation of International Application No. PCT/CN2020/129352, filed on Nov. 17, 2020, which claims the benefit of Chinese Patent Application No. 202010432769.6, filed on May 20, 2020. The entire disclosures of the above applications are incorporated herein by reference.

TECHNICAL FIELD

The present invention relates to the field of intelligent speech, in particular to a method and apparatus for testing a full-duplex speech interaction system.

BACKGROUND

In order to test the performance of a speech interaction system, various modules on a speech interaction link may be independently tested. For example, the awakening rate, the awakening time, the power consumption, etc., are tested through an awakening/signal processing module. The sentence error rate and the character error rate are tested through a speech recognition module. The accuracy rate, the recall rate, and the parsing accuracy rate are tested through a semantic understanding module. A speech synthesis module is scored based on multiple subjective evaluations. Most of existing speech interaction systems use half-duplex interaction, an absolutely ordered dependency relationship exists among various modules, and the entire system can complete interaction by calling various module in series. In this case, independent testing module by module can meet the requirements.

In the process of realizing the present invention, the inventors found that at least the following problems exist in the related art.

Since modules are tested independently and the test indicators are different, there are not testing methods and evaluation indicators for testing the speech interaction system as a whole. In complex systems where a plurality of modules make decisions by fusion, such as full-duplex systems, the indicators of each module can no longer meet the needs of evaluation. For example, for a half-duplex dialogue, a half-duplex speech interaction system responds every time a user speaks a sentence, while a full-duplex speech interaction system only responds to valid requests.

SUMMARY OF THE INVENTION

An objective of the present invention is to at least solve the problem of lack of testing methods and evaluation indicators for a speech interaction system as a whole in the prior art such that proper and effective testing cannot be realized for a full-duplex speech interaction system.

In a first aspect, an embodiment of the present invention provides a method for testing a full-duplex speech interaction system. The method includes:
  determining a scene mixed corpus set by mixing a valid corpus set related to a test scene with an invalid corpus set which is unrelated to the test scene;
  playing each corpus audio in the scene mixed corpus set to a speech interaction device under test equipped with the full-duplex speech interaction system;
  acquiring a work log of the speech interaction device under test, the work log including at least a first log and a second log, wherein,
  the first log records valid/invalid attributes recognized for each corpus audio and corresponding corpus text, and
  the second log records a decision result for each corpus audio, the decision result including response result and discarding result;
  determining a rejection rate based on a counted number of the corpus audios having the invalid attributes in the first log and a counted number of the discarding results in the second log; and
  obtaining number of false responses results according to a counted number of log entries which have false response result in the second log, the false response result referring to the response result that is expected not to be output but is actually output from the speech interaction device under test, and determining a false response rate based on the number of false responses and a total number of the played corpus audios in the scene mixed corpus set.

In a second aspect, an embodiment of the present invention provides an apparatus for testing a full-duplex speech interaction system. The apparatus includes:
  a corpus set determination program module configured to determine a scene mixed corpus set by mixing a valid corpus set related to a test scene with an invalid corpus set unrelated to the test scene;
  a test program module configured to play each corpus audio in the scene mixed corpus set to a speech interaction device under test equipped with the full-duplex speech interaction system;
  a log acquisition program module configured to acquire a work log of the speech interaction device under test, the work log including at least a first log and a second log, wherein,
  the first log records valid/invalid attributes recognized for each corpus audio and corresponding corpus text, and
  the second log records a decision result for each corpus audio, the decision including responding and discarding;
  a rejection rate determination program module configured to determine a rejection rate based on number of invalid corpus audios in the first log and number of discarding results in the second log; and
  a false response rate determination program module configured to obtain number of false response results according to a counted number of log entries which have false response result in the second log, the false response result referring to the response result that is expected not to be output but is actually output from the speech interaction device under test, and to determine a false response rate based on the number of false responses and a total number of the played corpus audios in the scene mixed corpus set.

In a third aspect, an electronic device is provided, including at least one processor and a memory communicatively coupled to the at least one processor. The memory stores instructions executable by the at least one processor to enable the at least one processor to perform the steps of the method for testing a full-duplex speech interaction system according to any embodiment of the present invention.

In a fourth aspect, an embodiment of the present invention provides a storage medium having a computer program stored therein, which, when being executed by a processor, performs the steps of the method for testing a full-duplex speech interaction system according to any embodiment of the present invention.

According to the embodiments of the present invention, end-to-end testing of a full-duplex speech interaction system is realized, and indicators for the unique characteristics of full duplex are accurately obtained. During testing, the characteristics of the full-duplex interaction system were fully covered, improving online interaction effects. Necessary data reproduction and indicator support are also provided, while automated testing reduces labor costs and improves testing efficiency. Moreover, the optimization period of the speech interaction system is improved, and the trial and error cost is reduced. Before such a testing of the system interaction success rate is proposed, interaction effects such as the interaction success rate and other indicators could be obtained by collecting user feedback through product sales. Now, estimated values in various scenarios can be obtained through testing before product sales.

BRIEF DESCRIPTION OF THE DRAWINGS

In order to illustrate the technical solutions of the embodiments of the present disclosure more clearly, a brief description of the accompanying drawings used in the description of the embodiments will be given as follows. Obviously, the accompanying drawings are some embodiments of the present disclosure, and those skilled in the art can also obtain other drawings based on these drawings without any creative effort.

DETAILED DESCRIPTION OF THE EMBODIMENTS

To make the objectives, technical solutions, and advantages of the embodiments of the present invention clearer, the technical solutions in the embodiments of the present invention will be described below with reference to the accompanying drawings in the embodiments of the present invention. Obviously, these embodiments are only some but not all of the embodiments of the present invention. All other embodiments that can be obtained by those skilled in the art without creative efforts based on the disclosed embodiments fall within the protection scope of the present invention.

An embodiment of the present invention provides a method for testing a full-duplex speech interaction system, which is applied to a test device. The test device may be an electronic device such as a computer, which is not limited in the present invention.

Figure 1:
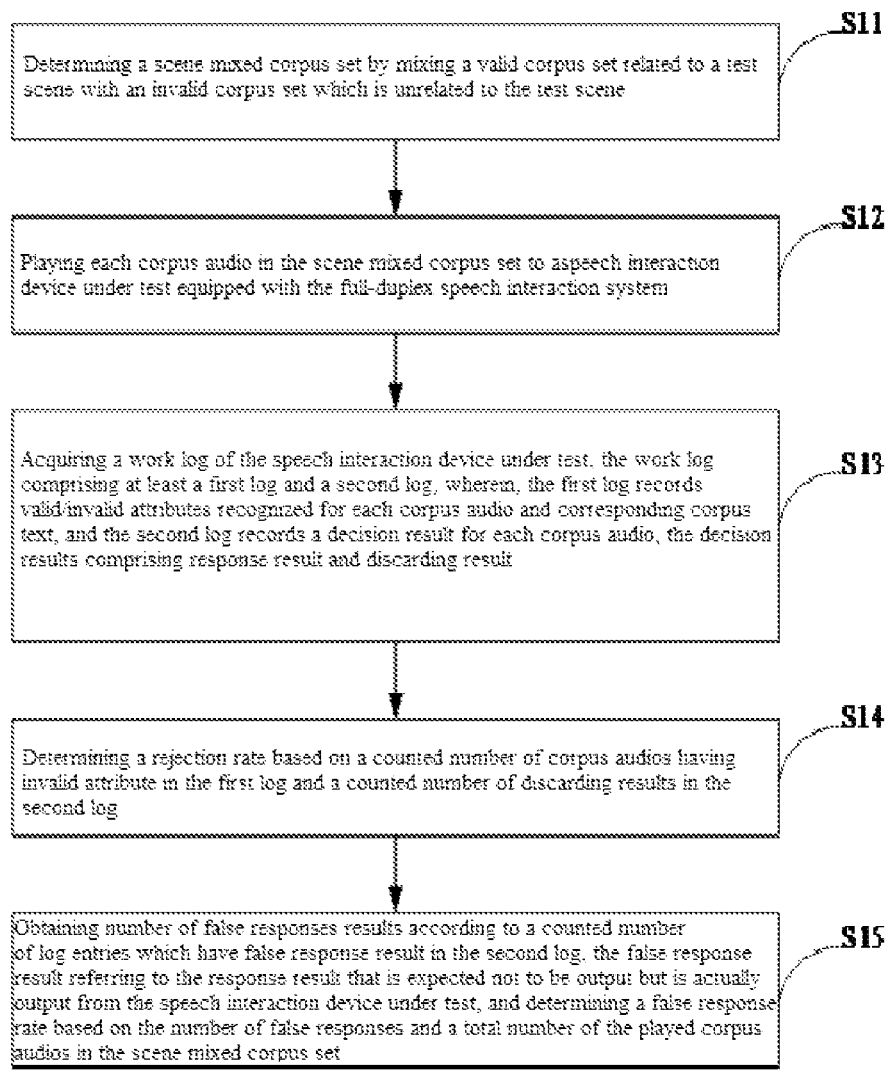
FIG. 1 is a flowchart of a method for testing a full-duplex speech interaction system according to an embodiment of the present invention.

FIG. 1 shows a flowchart of a method for testing a full-duplex speech interaction system according to an embodiment of the present invention. The method includes the following steps.

In S11, a scene mixed corpus set is determined by mixing a valid corpus set related to a test scene with an invalid corpus set which is unrelated to the test scene.

In S12, each corpus audio in the scene mixed corpus set is played to a speech interaction device under test equipped with the full-duplex speech interaction system.

In S13, a work log of the speech interaction device under test is acquired, the work log including at least a first log and a second log, wherein,
the first log records valid/invalid attributes recognized for each corpus audio and corresponding corpus text, and
the second log records a decision result for each corpus audio, the decision result including response result and discarding result.

In S14, a rejection rate is determined based on number of invalid corpus audios in the first log and number of discarding results in the second log.

In S15, number of false responses is obtained according to a counted number of log entries which have false response result in the second log, the false response result referring to the response result that is expected not to be output but is actually output from the speech interaction device under test, and a false response rate is determined based on the number of false responses and a total number of the played corpus audios in the scene mixed corpus set.

In this embodiment, test preparation is required, which includes:

1. Valid corpus, which should cover at least one specific scene, such as smart home, TV, vehicle, education, etc., as well as the vocabulary, service sentence patterns, and high-frequency fields of the scene.

2. Invalid corpus, which is a copy of unrelated corpus outside the designated scene prepared.

3. Background noise audio: a corresponding background noise is selected according to the scene, such as fan/air conditioner, stove/kitchenware, music/TV program, car engine/horn, thunderstorm/strong wind, noisy store, etc.

4. Test device, including
Computer, which is used to read a corpus audio, control the playback thereof, read a log of a device under test, and perform statistical analysis to obtain a test result, all devices under test being connected to the computer;
Two audio playback devices, such as a stereo/artificial mouth, which are used to play audios; and
Device under test, which is connected to a computer being capable of reading a log of the device in real time.

"Corpus" is a text containing one or more sentences and a recording audio corresponding to each sentence. "System decision result" is a decision result such as an operation instruction output by the system according to the input audio/information and other data. "System interaction result" is a result output by the system according to the input audio/information and other data in response to the current state, including a recognition result (text) of the response, text to be broadcast, action description on the device side, etc.

Figure 2:
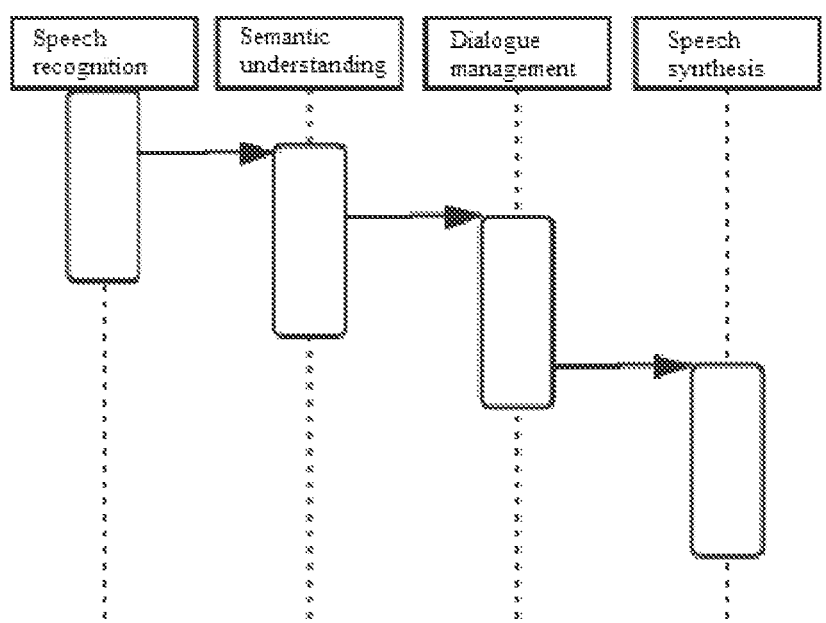
FIG. 2 is a schematic diagram of a parallel module of a method for testing a full-duplex speech interaction system according to an embodiment of the present invention.

In the full-duplex speech interaction system, a serial relationship no longer exists among modules, but parallel computations are performed on data from a plurality of modules, as particularly shown in FIG. 2. Therefore, the success rate of the entire system cannot be obtained after a simple multiplication of the "success rate" of each module.

In step S11, a certain amount of valid corpora prepared in the above steps covering a designated scene are acquired, such as "I want to listen to Andy Lau's song" in a smart home scene, and a certain amount of invalid corpora which is unrelated to the designated scene are acquired, such as "This is Speech Dialogue Workshop providing speech recognition capabilities.", then the valid corpus set and the invalid corpus set are merged and randomly sorted to determine a scene mixed corpus set.

In step S12, each corpus audio in the scene mixed corpus set is played one by one to the speech interaction device under test equipped with the full-duplex speech interaction system through a playback device, such as a stereo.

As an embodiment, the method further includes:

playing a preset background noise to the speech interaction device under test equipped with the full-duplex speech interaction system while playing each corpus audio in the scene mixed corpus set to the speech interaction device under test equipped with the full-duplex speech interaction system; and testing the speech interaction device under test based on the corpus audio containing the background noise.

Each corpus audio in the scene mixed corpus set is played to the speech interaction device under test equipped with the full-duplex speech interaction system through a first playback device.

The preset background noise is played to the speech interaction device under test equipped with the full-duplex speech interaction system through a second playback device.

In this embodiment, since two playback devices are prepared in advance and the stereo equipment for playing the corpus audio and the stereo equipment for playing the background noise are played at the same time, the character accuracy rate and the sentence accuracy rate can be further tested by adding noise to the played speech.

Whether the state of the device under test is as expected is determined as follows.

1. Whether the device has been in a pickup state.
2. Whether the system makes a decision of responding when playing a valid corpus audio.
3. Whether the system makes a decision of discarding after playing an invalid corpus audio.
4. Whether the system makes an interaction response after playing a valid corpus audio, and whether the response result is as expected.
5. Whether the system closes the pickup after playing an exit of the relevant corpus audio.

In step S13, since the device under test is connected to a computer which can read a log of the device in real time, corresponding log information can be obtained by acquiring a work log of the device under test.

As an example,

1. A piece of corpus audio is played and whether it is a valid corpus and the text of the sentence are recorded.
2. Whether the system gives a decision result when playing the corpus audio and whether the decision result is as expected.
3. Whether the system gives an interaction result after the playing of the corpus audio:
   a) whether the recognition result (text) of the response is as expected;
   b) whether the text to be broadcast is as expected; and
   c) whether the action description on the device side is as expected.
4. A time interval from the start of playback to the system returning a first character of the recognition result.
5. A time interval from the completion of playback to the system returning the recognition result of the entire sentence.
6. A time interval from the completion of playback to the system returning the complete interaction result.

More specifically:

1. 2020-05-11 09:00:00 Start playing valid corpus set 1, the corpus text is "I want to listen to Andy Lau's song"
2. 2020-05-11 09:00:01 Received real-time recognition result: "I"
3. 2020-05-11 09:00:01 Received real-time recognition result: "I want to"
4. 2020-05-11 09:00:02 Received real-time recognition result: "I want to listen to"
5. 2020-05-11 09:00:02 Received decision result: interrupt
6. 2020-05-11 09:00:03 Received real-time recognition result: "I want to listen to Andy"
7. 2020-05-11 09:00:03 Received the real-time recognition result: "I want to listen to Andy Lau"
8. 2020-05-11 09:00:03 End playing valid corpus 1
9. 2020-05-11 09:00:04 Received real-time recognition result: "I want to listen to Andy Lau's song"
10. 2020-05-11 09:00:05 Received interaction result, including the recognition result (text) of the response, the text to be broadcast, the action instruction on the device side.
1. 2020-05-11 09:01:00 Start playing invalid corpus 1. The corpus text is "This is Speech Dialogue Workshop providing speech recognition capabilities"
2. 2020-05-11 09:01:01 Received real-time recognition result: "Speech"
3. 2020-05-11 09:01:01 Received real-time recognition result: "Speech Dialogue"
4. 2020-05-11 09:01:02 Received real-time recognition result: Speech Dialogue Workshop"
5. 2020-05-11 09:01:02 Received decision result: interrupt
6. 2020-05-11 09:01:03 Received real-time recognition result: "This is Speech Dialogue Workshop providing"
7. 2020-05-11 09:01:03 Received real-time recognition result: "This is Speech Dialogue Workshop providing speech recognition"
8. 2020-05-11 09:01:03 End playing invalid corpus 1
9. 2020-05-11 09:01:04 Received real-time recognition result: "This is Speech Dialogue Workshop providing speech recognition capabilities"
10. 2020-05-11 09:01:05 Received decision result: Discard In the test, real-time recognition results can be received during playback, such as logs 2, 3, 4, 6, 7, and 9 (i.e., the sequence numbers 2, 3, 4, 6, 7, and 9 in the log examples above). However, for special detection, when testing a certain test item, only part of the information in the log is required. Further, the numbers of the logs can be classified, which is convenient for operation. For example: log 1. 2020-05-11 09:01:00 Start playing invalid corpus 1. The corpus text is "This is Speech Dialogue Workshop providing speech recognition capabilities", and log 1. 2020-05-11 09:01:00 Start playing invalid corpus 1. The corpus text is "This is Speech Dialogue Workshop providing speech recognition capabilities", they are classified into a first log that records the valid/invalid attributes recognized for each corpus audio and the corresponding corpus text. Decision results can also be received, such as "decision results" in log 5 and log 10, which are classified into a second log. Decision results include responding, interrupting, and discarding.

In step S14, taking the log of the invalid corpus as an example, the finally obtained interaction decision is [discard], that is, no interaction response is made to the input of this sentence. That is to say, because invalid corpora should be discarded, but in practice, a speech that should not be responded may be responded by mistake. As such, a rejection rate is proposed. Rejection rate=the number of all [discarded] log entries/the number of played corpora having invalid attribute.

For step S15, however, not all decision results are as expected. For example, log 5 in the invalid corpus should not have a decision result of [interrupt] Similarly, for log 10 in the invalid corpus, if it is not [discard] but an interaction result, it is not as expected either.

Since the corresponding corpus text, such as "I want to listen to Andy Lau's song" and "This is Speech Dialogue Workshop providing speech recognition capabilities" have been recorded in the first log, based on which expected decision results can be determined.

Number of false responses is obtained according to a counted number of log entries which have false response result in the second log, the false response result referring to the response result that is expected not to be output but is actually output from the speech interaction device under test. Then a false response rate is determined based on the number of false responses and a total number of the played corpus audios in the scene mixed corpus set. Namely, false response rate=the number of false responses/the number of the played corpus audios in the scene mixed corpus set.

"False response rate" and "rejection rate" do not exist in half duplex. Taking the false response rate as an example, all requests will be responded in case of half duplex, but only valid requests will be responded in case of full duplex, and as such, a false response rate exists. Similarly, there is no interruption in case of half duplex, in which when the synthesized sound output by the device is being played, the pickup means of the device is not turned on and therefore cannot be interrupted.

It can be seen from this embodiment that end-to-end testing of a full-duplex speech interaction system is realized, and accurate indicators for the unique characteristics of full duplex are obtained. During testing, the characteristics of the full-duplex interaction system were fully covered, thereby improving online interaction effects. Necessary data reproduction and indicator support are also provided, while automated testing reduces labor costs and improves testing efficiency. Moreover, the optimization period of the speech interaction system is improved, and the trial and error cost is reduced. Before appearance of the system interaction success rate test, interaction effects such as the interaction success rate and other indicators should be obtained by collecting user feedback through product sales. Now, estimated values in various scenarios can be obtained through testing before product sales.

As an embodiment, the work log includes at least a third log.

The third log records an interaction result for each corpus audio, the interaction result including text of the corpus audio to be broadcasted and a device action instruction of the corpus audio.

Corresponding expected text to be broadcasted and an expected device action instruction are determined based on the corpus text of each corpus audio in the first log.

It is determined that the interaction result is as expected when the text to be broadcast in the interaction result of each corpus audio matches the corresponding expected text to be broadcast and the device action instruction matches the corresponding expected device action instruction.

Number of successful interactions is then obtained according to a counted number of log entries of the interaction result as expected in the third log, and a success rate of interaction is determined based on the number of successful interactions and the total number of corpus audios played.

In this embodiment, log 10 of "received interaction result" is determined as the third log, which is used to record the interaction result for each corpus audio, including {recognition result, text to be broadcast, action instruction}.

Likewise, since the first log contains the corpus text of each corpus audio, the corresponding expected text to be broadcasts and the expected device action instruction can be determined. For example, the expected text to be broadcast of "I want to listen to Andy Lau's song" is: "Play "Forgetting Love Water" for you)", and the action instruction is to call the music skill to play "Forgetting Love Water".

The interaction success rate does not depend on the recognition result, because even if the recognition result is incorrect, a correct interaction can be obtained. For example, if "ou-xiang-ting-liu-de-hua-de-ge (Chinese speech, means "Idol listens to Andy Lau's song, wherein ou-xiang may correspond to Chinese for "I want" or "Idol")" is misrecognized, it is very likely that the actual text to be broadcast is still "Play "Forgetting Love Water" for you", and the actual action instruction is to call the music skill to play "Forgetting Love Water".

If being as expected is set as 1 and being not as expected is set as 0, then, when {recognition result, text to be broadcast, action instruction} is 011 or 111 upon comparison with the expectations, the interaction result is as expected.

Finally, the interaction success rate of the full-duplex speech interaction system is obtained as "interaction success rate"=the number of all corpora as expected/the number of all corpora as played.

It can be seen from this embodiment that since serial execution is performed in case of half-duplex, each module is tested separately to finally obtain the result of the interaction success rate. However, since parallel execution is performed in case of full duplex, the result of the interaction success rate can only be obtained through the end-to-end test of this method.

As an embodiment, the third log records an interaction result for each corpus audio, the interaction result further including a recognition result of the corpus audio.

A recognized character accuracy rate and a recognized sentence accuracy rate are determined based on the corpus text of each corpus audio in the first log and the recognition result of the corpus audio.

By comparing the recognition results (text) of the responses in the first log and the third log (log 10), the "recognized sentence accuracy rate" and "recognized character accuracy rate" can be obtained, which are in the same way as the calculation method in case of half duplex, except that log 1 is compared with log 9 in case of half duplex, but compared with log 10 in case of full duplex. For example, the recognition result of the whole sentence is "How to write yun (cloud) of yun-do(cloud))", while the response content in case of full duplex may be "yun(cloud) of yun-do(cloud))".

The difference between full duplex and half duplex lies in interaction instead of playback. The interaction in case of half duplex is one-to-one, in which one request is accompanied with one response. In the case of full duplex, the interaction is many-to-many, in which one request may have a plurality of responses, and a plurality of requests may also have only one response. Thus, the recognized character accuracy rate and the recognized sentence accuracy rate are affected.

As an embodiment, the work log includes at least a fourth log, a fifth log, and a sixth log.

the fourth log records a first time stamp at which each corpus audio ends playing;

the fifth log records a second time stamp for determining a recognition result after each corpus audio ends playing; and the sixth log records a third time stamp for determining an interaction result moment of each corpus audio.

A recognition response time of the speech interaction device under test is determined based on a time difference between the second time stamp and the first time stamp.

An interaction response time of the speech interaction device under test is determined based on a time difference between the third time stamp and the second time stamp.

The timestamp "2020-05-11 09:00:03" in log 8 is determined as the fourth log. The timestamp "2020-05-11 09:00:04" in log 9 is determined as the fifth log. The timestamp "2020-05-11 09:00:05" with the interaction result in log 10 is determined as the sixth log.

As "2020-05-11 09:00:04"-"2020-05-11 09:00:03"=1 second, it can be obtained that the response time of the system responding to recognition is 1 second.

As "2020-05-11 09:00:05"-"2020-05-11 09:00:04"=1 second, it can be obtained that the response time of the system responding to interaction is 1 second.

Figure 3:
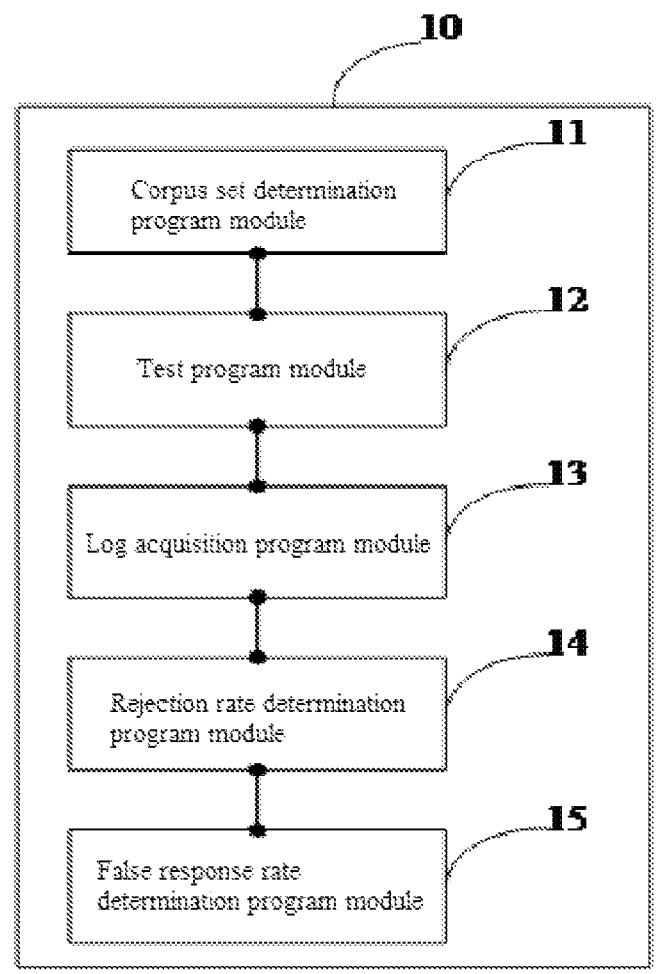
FIG. 3 is a schematic structural diagram of an apparatus for testing a full-duplex speech interaction system according to an embodiment of the present invention.

FIG. 3 is a schematic structural diagram of an apparatus for testing a full-duplex speech interaction system according to an embodiment of the present invention. The device can perform the method for testing a full-duplex speech interaction system according to any of the above-mentioned embodiments, and configured in a test device.

The apparatus for testing a full-duplex speech interaction system according to this embodiment includes a corpus set determination program module 11, a test program module 12, a log acquisition program module 13, a rejection rate determination program module 14, and a false response rate determination program module 15.

The corpus set determination program module 11 is configured to determine a scene mixed corpus set by mixing a valid corpus set related to a test scene with an invalid corpus set which is unrelated to the test scene. The test program module 12 is configured to play each corpus audio in the scene mixed corpus set to a speech interaction device under test equipped with the full-duplex speech interaction system. The log acquisition program module 13 is configured to acquire a work log of the speech interaction device under test, the work log including at least a first log and a second log, wherein the first log records valid/invalid attributes recognized for each corpus audio and corresponding corpus text, and the second log records a decision result for each corpus audio, the decision result including responding result and discarding result. The rejection rate determination program module 14 is configured to determine a rejection rate based on number of corpus audios having invalid attribute in the first log and number of discarding results in the second log. The false response rate determination program module 15 is configured to obtain number of false response results according to a counted number of log entries which have false response result in the second log, and to determine a false response rate based on the number of false responses and a total number of the played corpus audios in the scene mixed corpus set. The false response result refers to the response result that is expected not to be output but is actually output from the speech interaction device under test.

An embodiment of the present invention further provides a non-volatile computer storage medium storing computer-executable instructions. The computer-executable instructions can perform the method for testing a full-duplex speech interaction system in any of the above method embodiments.

In an embodiment, the non-volatile computer storage medium storing computer-executable instructions configured to:

determine a scene mixed corpus set by mixing a valid corpus set related to a test scene with an invalid corpus set which is unrelated to the test scene;

play each corpus audio in the scene mixed corpus set to a speech interaction device under test equipped with the full-duplex speech interaction system;

acquire a work log of the speech interaction device under test, the work log comprising at least a first log and a second log, wherein the first log records valid/invalid attributes recognized for each corpus audio and corresponding corpus text, and the second log records a decision result for each corpus audio, the decision results comprising response result and discarding result;

determine a rejection rate based on a counted number of corpus audios having invalid attribute in the first log and a counted number of discarding results in the second log; and obtain number of false responses results according to a counted number of log entries which have false response result in the second log, the false response result referring to the response result that is expected not to be output but is actually output from the speech interaction device under test, and determine a false response rate based on the number of false responses and a total number of the played corpus audios in the scene mixed corpus set.

As a non-volatile computer-readable storage medium, non-volatile software programs, non-volatile computer-executable programs and modules can be stored therein, such as the program instruction/module corresponding to the method for determining a skill field of a dialogue text in the embodiments of the present invention. One or more program instructions can be stored in the non-volatile computer-readable storage medium, and perform the method for testing a full-duplex speech interaction system, applied to a test device according to any of the above method embodiments when being executed by the processors.

The non-volatile computer storage medium may include a storage program area and a storage data area. The storage program area may store an operating system and application programs required by at least one function. The storage data area may store data generated according to the use of a full-duplex voice dialogue systems and the like. In addition, the non-volatile computer storage medium may include a high-speed random access memory, and may also include a non-volatile memory, such as at least one magnetic disk storage device, a flash memory device, or other non-volatile solid-state storage devices. In some embodiments, the non-volatile computer storage medium may optionally include memories remotely disposed with respect to the processor, and these remote memories may be connected to a full-duplex voice dialogue through a network. Examples of the above network include but are not limited to the Internet, intranet, local area network, mobile communication network, and combinations thereof.

An embodiment of the present invention further provides an electronic device, including: at least one processor, and a memory communicatively coupled to the at least one processor. The memory stores instructions executable by the at least one processor. The instructions are executed by the at least one processor to enable the at least one processor to perform the method containing the following steps:

determining a scene mixed corpus set by mixing a valid corpus set related to a test scene with an invalid corpus set which is unrelated to the test scene;

playing each corpus audio in the scene mixed corpus set to a speech interaction device under test equipped with the full-duplex speech interaction system;

acquiring a work log of the speech interaction device under test, the work log comprising at least a first log and a second log, wherein the first log records valid/invalid attributes recognized for each corpus audio and corresponding corpus text, and the second log records a decision result for each corpus audio, the decision results comprising response result and discarding result;

determining a rejection rate based on a counted number of corpus audios having invalid attribute in the first log and a counted number of discarding results in the second log; and obtaining number of false responses results according to a counted number of log entries which have false response result in the second log, the false response result referring to the response result that is expected not to be output but is actually output from the speech interaction device under test, and determining a false response rate based on the number of false responses and a total number of the played corpus audios in the scene mixed corpus set.

In some embodiments, the work log comprises at least a third log;

the third log records an interaction result for each corpus audio, the interaction result comprising text of the corpus audio to be broadcasted and a device action instruction for the corpus audio;

determining corresponding expected text to be broadcast and an expected device action instruction based on the corpus text of each corpus audio in the first log;

determining that the interaction result is as expected when the text to be broadcast in the interaction result of each corpus audio matches the corresponding expected text to be broadcast and the device action instruction matches the corresponding expected device action instruction; and obtaining number of successful interactions according to a counted number of log entries of the interaction result as expected in the third log, and determining a success rate of interaction based on the number of successful interactions and the total number of corpus audios played.

In some embodiments, the third log records an interaction result for each corpus audio, the interaction result further comprising a recognition result of the corpus audio.

A recognized character accuracy rate and a recognized sentence accuracy rate are determined based on the corpus text of each corpus audio in the first log and the recognition result of the corpus audio.

In some embodiments, the work log comprises at least a fourth log and a fifth log.

The fourth log records a first time stamp at which each corpus audio ends playing.

The fifth log records a second time stamp for determining a recognition result after each corpus audio ends playing.

A recognition response time of the speech interaction device under test is determined based on a time difference between the second time stamp and the first time stamp.

In some embodiments, the work log comprises at least a sixth log.

The sixth log records a third time stamp for determining an interaction result moment of each corpus audio.

An interaction response time of the speech interaction device under test is determined based on a time difference between the third time stamp and the second time stamp.

In some embodiments, the processor is further configured to play a preset background noise to the speech interaction device under test equipped with the full-duplex speech interaction system while playing each corpus audio in the scene mixed corpus set to the speech interaction device under test equipped with the full-duplex speech interaction system; and test the speech interaction device under test based on the corpus audio containing the background noise.

In some embodiments, when playing the preset background noise to the speech interaction device under test equipped with the full-duplex speech interaction system while playing each corpus audio in the scene mixed corpus set to the speech interaction device under test equipped with the full-duplex speech interaction system, the following steps are included:

playing each corpus audio in the scene mixed corpus set to the speech interaction device under test equipped with the full-duplex speech interaction system through a first playback device; and playing the preset background noise to the speech interaction device under test equipped with the full-duplex speech interaction system through a second playback device.

Figure 4:
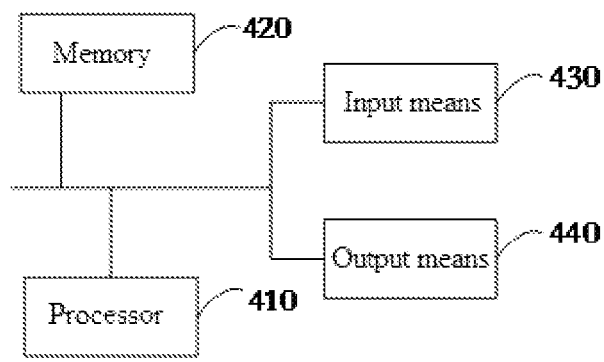
FIG. 4 is a schematic structural diagram of an embodiment of an electronic device of the present invention.

FIG. 4 is a schematic diagram of a hardware structure of an electronic device for carrying out a method for testing a full-duplex speech interaction system according to another embodiment of the present invention. As shown in FIG. 4, the device includes:

one or more processors 410 and a memory 420, in which one processor 410 is taken as an example in FIG. 4.

The device for carrying out the method for testing a full-duplex speech interaction system may further include an input means 430 and an output means 440.

The processor 410, the memory 420, the input means 430, and the output means 440 may be connected through a bus or in other ways, in which the connection through a bus is taken as an example in FIG. 4.

As a non-volatile computer-readable storage medium, the memory 420 may store non-volatile software programs, non-volatile computer-executable programs and modules, such as the program instruction/module corresponding to the method for testing a full-duplex speech interaction system in the embodiments of the present invention. The processor 410 executes various functional applications and data processing of a server by running the non-volatile software programs, instructions and modules stored in the memory 420, that is, to realize the method for testing a full-duplex speech interaction system in the above embodiments.

The memory 420 may include a stored program area and a stored data area. The stored program area may store an operating system, an application program required for at least one function. The stored data area may store data created according to the use of the apparatus for testing a full-duplex speech interaction system, and the like. Additionally, the memory 420 may include high speed random access memory and nonvolatile memory, such as at least one magnetic disk storage device, flash memory device, or other nonvolatile solid state storage device. In some embodiments, the memory 420 may include a memory located remotely relative to the processor 410 and connected to the apparatus for testing a full-duplex speech interaction system through a network. Examples of such networks include, but are not limited to, the Internet, an intranet, a local area network, a mobile communication network, and combinations thereof.

The input means 430 may receive input numerical or character information, and generate signals related to user settings and function control of the apparatus for testing a full-duplex speech interaction system. The output means 440 may include a display device such as a display screen.

The memory 420 stores one or more modules, which, when being executed by the one or more processors 410, perform the method for testing a full-duplex speech interaction system in any of the above method embodiments.

The above product can execute the method provided by the embodiments of the present application, and has functional modules and beneficial effects corresponding to the execution of the method. For technical details not described specifically in the embodiments, reference may be made to the methods provided in the embodiments of the present application.

The electronic devices in the embodiments of the present application may be in various forms, including but not limited to:
(1) Mobile communication device which features in its mobile communication function and the main goal thereof is to provide voice and data communication, such as smart phones (such as iPhone), multimedia phones, functional phones, and low-end phones;
(2) Ultra-mobile personal computer device which belongs to the category of personal computers and has computing and processing functions and generally mobile Internet access capability, such as PDA, MID and UMPC devices, e.g., iPad;
(3) Portable entertainment devices which can display and play multimedia content, such as audio and video players (such as iPod), handheld game consoles, e-books, and smart toys and portable car navigation devices; and
(4) Other electronic devices with data interaction function.

The embodiments of devices described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

The above embodiments are merely intended to illustrate the technical solutions of the present invention, rather than limiting them. Those skilled in the art may modify the technical solutions described in the above embodiments, or replace some of the technical features therein. These modifications or substitutions do not make the essence of the corresponding technical solutions depart from the spirit and scope of the technical solutions of the embodiments of the present invention.

What is claimed is:

1. A method for testing a full-duplex speech interaction system, applied to a test device, the method comprising:
   determining a scene mixed corpus set by mixing a valid corpus set related to a test scene with an invalid corpus set which is unrelated to the test scene;
   playing each corpus audio in the scene mixed corpus set to a speech interaction device under test equipped with the full-duplex speech interaction system;
   acquiring a work log of the speech interaction device under test, the work log comprising at least a first log and a second log, wherein,
   the first log records valid/invalid attributes recognized for each corpus audio and corresponding corpus text, and
   the second log records a decision result for each corpus audio, the decision results comprising response result and discarding result;
   determining a rejection rate based on a counted number of corpus audios having invalid attribute in the first log and a counted number of discarding results in the second log; and
   obtaining number of false responses results according to a counted number of log entries which have false response result in the second log, the false response result referring to the response result that is expected not to be output but is actually output from the speech interaction device under test, and determining a false response rate based on the number of false responses and a total number of the played corpus audios in the scene mixed corpus set.

2. The method according to claim 1, wherein the work log comprises at least a third log;
   the third log records an interaction result for each corpus audio, the interaction result comprising text of the corpus audio to be broadcasted and a device action instruction for the corpus audio;
   determining corresponding expected text to be broadcast and an expected device action instruction based on the corpus text of each corpus audio in the first log;
   determining that the interaction result is as expected when the text to be broadcast in the interaction result of each corpus audio matches the corresponding expected text to be broadcast and the device action instruction matches the corresponding expected device action instruction; and
   obtaining number of successful interactions according to a counted number of log entries of the interaction result as expected in the third log, and determining a success rate of interaction based on the number of successful interactions and the total number of corpus audios played.

3. The method according to claim 2, wherein the third log records an interaction result for each corpus audio, the interaction result further comprising a recognition result of the corpus audio;
   determining a recognized character accuracy rate and a recognized sentence accuracy rate based on the corpus text of each corpus audio in the first log and the recognition result of the corpus audio.

4. The method according to claim 1, wherein the work log comprises at least a fourth log and a fifth log;
the fourth log records a first time stamp at which each corpus audio ends playing; and
the fifth log records a second time stamp for determining a recognition result after each corpus audio ends playing;
determining a recognition response time of the speech interaction device under test based on a time difference between the second time stamp and the first time stamp.

5. The method according to claim 4, wherein the work log comprises at least a sixth log;
the sixth log records a third time stamp for determining an interaction result moment of each corpus audio;
determining an interaction response time of the speech interaction device under test based on a time difference between the third time stamp and the second time stamp.

6. The method according to claim 1, further comprising:
playing a preset background noise to the speech interaction device under test equipped with the full-duplex speech interaction system while playing each corpus audio in the scene mixed corpus set to the speech interaction device under test equipped with the full-duplex speech interaction system; and
testing the speech interaction device under test based on the corpus audio containing the background noise.

7. The method according to claim 6, wherein playing the preset background noise to the speech interaction device under test equipped with the full-duplex speech interaction system while playing each corpus audio in the scene mixed corpus set to the speech interaction device under test equipped with the full-duplex speech interaction system comprises:
playing each corpus audio in the scene mixed corpus set to the speech interaction device under test equipped with the full-duplex speech interaction system through a first playback device; and
playing the preset background noise to the speech interaction device under test equipped with the full-duplex speech interaction system through a second playback device.

8. An apparatus for testing a full-duplex speech interaction system, comprising:
a corpus set determination program module configured to determine a scene mixed corpus set by mixing a valid corpus set related to a test scene with an invalid corpus set unrelated to the test scene;
a test program module configured to play each corpus audio in the scene mixed corpus set to a speech interaction device under test equipped with the full-duplex speech interaction system;
a log acquisition program module configured to acquire a work log of the speech interaction device under test, the work log comprising at least a first log and a second log, wherein,
the first log records valid/invalid attributes recognized for each corpus audio and corresponding corpus text, and
the second log records a decision result for each corpus audio, the decision results comprising response result and discarding result;
a rejection rate determination program module configured to determine a rejection rate based on number of invalid corpus audios in the first log and number of discarding results in the second log; and
a false response rate determination program module configured to obtain number of false responses according to a counted number of log entries which have false response result in the second log, the false response result referring to the response result that is expected not to be output but is actually output from the speech interaction device under test, and determine a false response rate based on the number of false responses and a total number of the played corpus audios in the scene mixed corpus set.

9. An electronic device comprising: at least one processor, and a memory communicatively coupled to the at least one processor, wherein the memory stores instructions executable by the at least one processor, the instructions being executed by the at least one processor to enable the at least one processor to perform the steps of the method of claim 1.

10. A non-transitory storage medium having a computer program stored therein, wherein the program, when being executed by a processor, performs the steps of the method according to claim 1.

* * * * *